(12) United States Patent
Wadekar

(10) Patent No.: US 7,461,142 B2
(45) Date of Patent: Dec. 2, 2008

(54) METHOD AND APPARATUS FOR ADDRESS MANAGEMENT IN A NETWORK DEVICE

(75) Inventor: Manoj K. Wadekar, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 755 days.

(21) Appl. No.: 10/329,213

(22) Filed: Dec. 23, 2002

(65) Prior Publication Data

US 2004/0122929 A1   Jun. 24, 2004

(51) Int. Cl.
G06F 15/173   (2006.01)

(52) U.S. Cl. .................. 709/223; 709/201; 709/224; 709/225; 709/230; 709/232; 370/235; 370/254

(58) Field of Classification Search .................. 709/223, 709/201, 224, 225, 230, 232; 370/235, 254
See application file for complete search history.

(56) References Cited

U.S. PATENT DOCUMENTS

| | | | | | |
|---|---|---|---|---|---|
| 4,894,824 | A | * | 1/1990 | Hemmady et al. | 370/380 |
| 6,104,696 | A | * | 8/2000 | Kadambi et al. | 370/218 |
| 6,400,715 | B1 | * | 6/2002 | Beaudoin et al. | 370/392 |
| 6,560,229 | B1 | * | 5/2003 | Kadambi et al. | 370/392 |
| 6,791,949 | B1 | * | 9/2004 | Ryu et al. | 370/254 |
| 6,912,637 | B1 | * | 6/2005 | Herbst | 711/167 |
| 6,940,814 | B1 | * | 9/2005 | Hoffman | 370/235 |
| 7,046,679 | B2 | * | 5/2006 | Sampath et al. | 370/395.53 |

\* cited by examiner

*Primary Examiner*—Tonia L Dollinger
*Assistant Examiner*—Kyung H Shin
(74) *Attorney, Agent, or Firm*—Caven & Aghevli LLC

(57) ABSTRACT

Numerous embodiments of a method and apparatus for address management in a network device are disclosed.

40 Claims, 3 Drawing Sheets

METHOD AND APPARATUS FOR ADDRESS MANAGEMENT IN A NETWORK DEVICE

BACKGROUND

A computer network typically comprises a number of network devices interconnected by communications media. One or more devices connected to the network may provide functionality including relaying or routing of network information between two or more devices coupled to the network. A typical network may employ a number of switches to provide this functionality, and each switch may switch and/or route packets between one or more other network devices, or between one or more networks.

Network devices, such as switches, that direct data in a computer network rely on a routing and/or address table to send the data to correct destinations. This table typically links or matches an Internet protocol (IP) address or hardware address, such as a media control access (MAC) address, to a port address and/or a destination address. For example, when a switch receives a packet containing a TCP/IP Layer 2/3/4 address, the switch may perform a table lookup on the destination address of the packet in order to determine on which port to forward the packet. A table such as an address table may be built by learning the unresolved addresses from received packets and adding the learned addresses to the table, for example.

Tables, such as address tables, may be maintained by a switch, and may be used for making forwarding decisions, for example. In addition, a switch may comprise a processor subsystem. The processor subsystem may perform system management functions, and may additionally maintain one or more tables such as an address table, where the one or more tables may be used for system management functions. In operation, these multiple tables of address information may become unsynchronized. In order to update the database, the processor of the processor subsystem may poll the switch at regular intervals. However, this may result in long duration between polling operations where the tables may be unsynchronized. Additionally, this method of updating may unduly burden one or more components of the switch and may, for example, affect the ability of a switch to learn new addresses. A need exists, therefore, for a method of table synchronization that reduces the time period that two or more tables are out of synch, while not unduly burdening one or more subsystems of a network device such as a switch.

BRIEF DESCRIPTION OF THE DRAWINGS

The subject matter regarded as embodiments of the claimed subject matter is particularly pointed out and distinctly claimed in the concluding portion of the specification. Embodiments of the claimed subject matter, however, both as to organization and method of operation, together with objects, features, and advantages thereof, may best be understood by reference to the following detailed description when read with the accompanying drawings in which:

DETAILED DESCRIPTION

Figure 1:
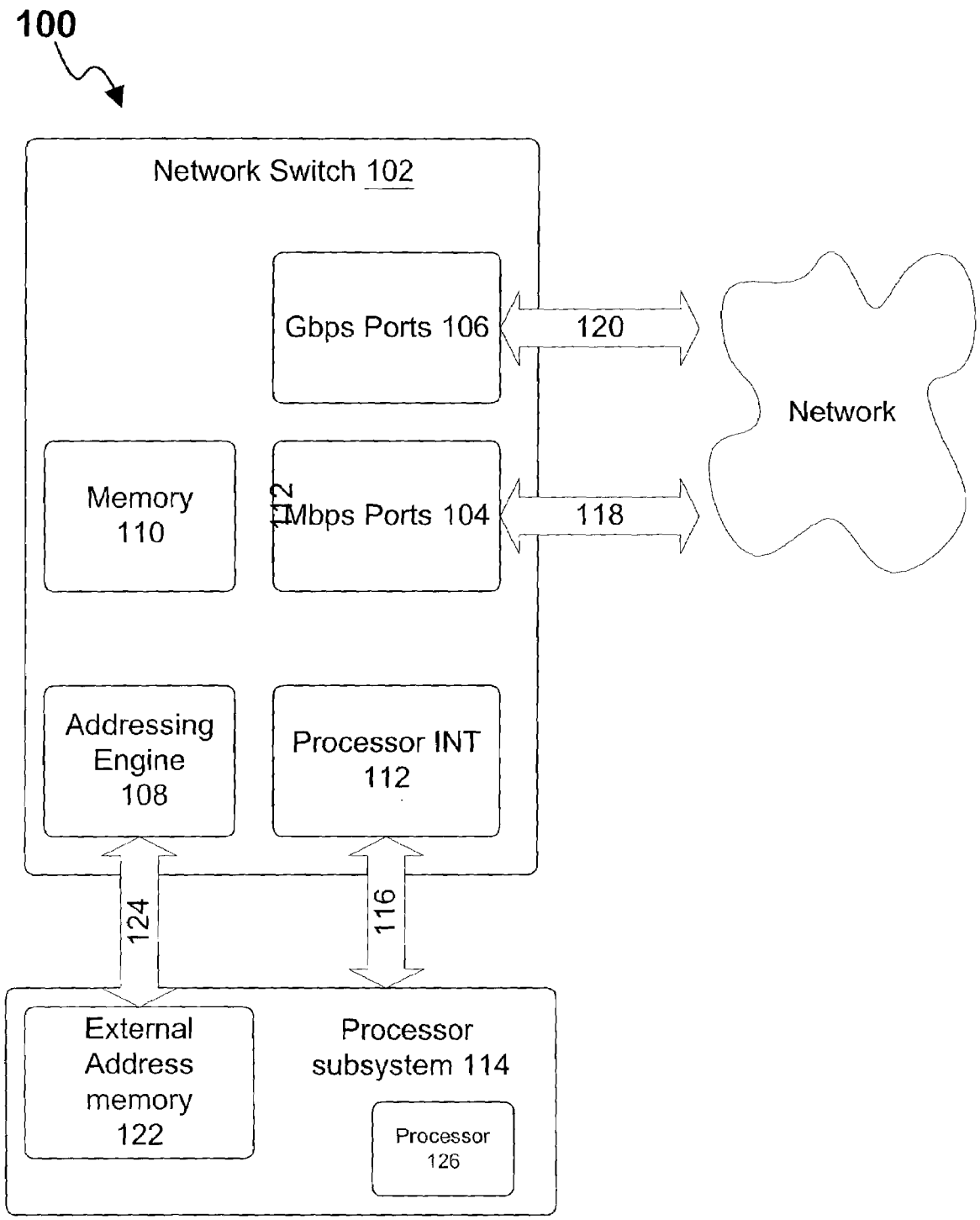
FIG. 1 is a device suitable for practicing one embodiment of the claimed subject matter.

Embodiments of the claimed subject matter may comprise a method and apparatus for address management in a network device, such as an ethernet switch. A typical network employs a number of switches, where each switch relays packets between a set of hosts or networks. The switches can be connected in a wide variety of topologies, such as daisy-chain, ring, star, or star-wired matrix. Each switch typically has a number of ports and an address table, which may also be referred to as a forwarding database (FDB) that maps one or more packet addresses to the ports on the switch. Additionally, information other than addresses may be stored in such a database such as an address database, including, for example, rules that may assist in the routing of data packets. A switching device, such as an Intel® Media Switch IXE2424 10/100+ Gigabit L2/3/4 device, may be comprised of an ASIC (Application Specific Integrated Circuit) and a number of ports, and may utilize a processor subsystem to perform functions including system management, for example. System management may be performed by use of simple network management protocol (SNMPv3, Internet Engineering Steering Group—IESG). In order to properly administer or manage one or more devices on a network, an address database is typically maintained by the processor subsystem, and may comprise, for example, a MDB (management database). The MDB may be based on the address table maintained by the switch. In order to properly perform management functions, the MDB will ideally have the same address content as the FDB. However, conventional approaches for synchronizing the two databases may result in long periods of time when the two databases are out of synchronization, meaning, for example, that they do not have the same content. In one embodiment of the claimed subject matter, a technique for maintaining the FDB and the MDB, resulting in a decrease in the out of synch window, as well as a more efficient use of system resources, is disclosed.

Embodiments of the claimed subject matter may comprise a method and apparatus for address management in a network device. In one embodiment, a method of address management comprises learning information relating to one or more network addresses, updating a first address database, where the database is managed by a first device, providing a notification of the update to a second device managing a second address database, and providing at least a portion of the update information to a second device.

It is worthy to note that any reference in the specification to "one embodiment" or "an embodiment" means that a particular feature, structure, or characteristic described in connection with the embodiment is included in at least one embodiment of the claimed subject matter. The appearances of the phrase "in one embodiment" in various places in the specification are not necessarily all referring to the same embodiment.

Numerous specific details may be set forth herein to provide a thorough understanding of the embodiments of the claimed subject matter. It will be understood by those skilled in the art, however, that the embodiments of the claimed subject matter may be practiced without these specific details. In other instances, well-known methods, procedures, components and circuits have not been described in detail so as not to obscure the embodiments of the claimed subject matter. It can be appreciated that the specific structural and functional details disclosed herein may be representative and do not necessarily limit the scope of the claimed subject matter.

Referring now in detail to the drawings wherein like parts are designated by like reference numerals throughout, there is illustrated in FIG. 1 a device suitable for practicing one embodiment of the claimed subject matter. FIG. 1 is a block diagram of a device 100, which may comprise a network switch system. Switch system 100 may be comprised of the following components, but it is important to note that many configurations of a network device such as a switch system exist that may perform one or more embodiments of the claimed subject matter, and the claimed subject matter is not limited to just this particular configuration. Switch system 100 may be comprised of a network switch 102. Network switch 102 may be comprised of one or more ports, such as Mbps (Megabits per second) Ports 104 and Gbps (Gigabits per second) ports 106. In operation, these ports may perform such functions as sending and/or receiving data packets, for example. A packet, in the context used to describe embodiments of the claimed subject matter, may comprise a sequence of digital data pulses, with the sequence typically comprising a particular number of bits or bytes, such as 1000 bytes, for example. Packets may be sent and/or received by using one or more types of data protocols, such as the transmission control protocol (TCP), as defined by the Internet Engineering Task Force (IETF) standard 7, Request For Comments (RFC) 793, adopted in September 1981 ("TCP Specification"), available at www.ietf.org, and the Ethernet protocol as defined by the Institute for Electrical and Electronics Engineers (IEEE) standard 802.3, 2000 edition ("Ethernet Specification"), available from IEEE standards, 445 Hoes Lane, P.O. Box 1331, Piscataway, N.J., 08855-1331. Additional information may be found on the World Wide Web (WWW) at the following URL: http://www.ieee.org. Ports 104 and 106 may, in operation, be coupled to a network through communications media 118 and 120. Communications media may comprise any media capable of carrying information signals, such as, for example, twisted-pair wire, co-axial cable, fiber optic cable, category 5 (CAT-5) network cabling, or radio waves, for example.

The one or more ports, as well as other components of network switch 102, may be coupled by one or more bus systems (not shown). Network device may be comprised of one or more memory components, such as memory 110, which may be RAM memory, for example. Memory 110 may be used to store address information such as a FDB, or temporarily store packets or packet fragments, for example. Addressing engine 108 may comprise a portion of an ASIC, for example, and may perform table lookups by accessing an address table such as a FDB, which may be stored in memory 110, or alternatively may be stored in external address memory 122 of processor subsystem 114, for example. External address memory 122 may be accessed by way of an interface 124, which may comprise a CAM (content addressable memory) interface, for example, which may provide direct access from the network switch 102 to one or more memory locations of the processor subsystem 114, providing direct access from the FDB to the MDB, in one embodiment. Additionally, addressing engine 108 may perform functions relating to address table management, including maintenance of a FDB, for example.

Switch 102 may be coupled to a processor subsystem 114. Processor subsystem may be comprised of a processor, such as a general-purpose processor 126, and one or more memory components 122. Switch 102 may have a processor interface 112, for interfacing with the processor subsystem. By use of the processor interface 112, switch 102 may be coupled to processor subsystem 114, and may use a communication interface such as a PCI interface, for example. Processor subsystem 114 may perform management functions for one or more components of the switch or the processor subsystem, and may maintain an address database such as a MDB, for example, which may be maintained in address memory 122. A switch device such as the above-referenced Intel Media Switch IXE2424 10/100+ Gigabit L2/3/4 device, may be comprised of 24 Mbps ports, 4 Gbps ports, and may interface to a general purpose processor through a 32-bit PCI interface, for example.

Figures 2A, 2B:
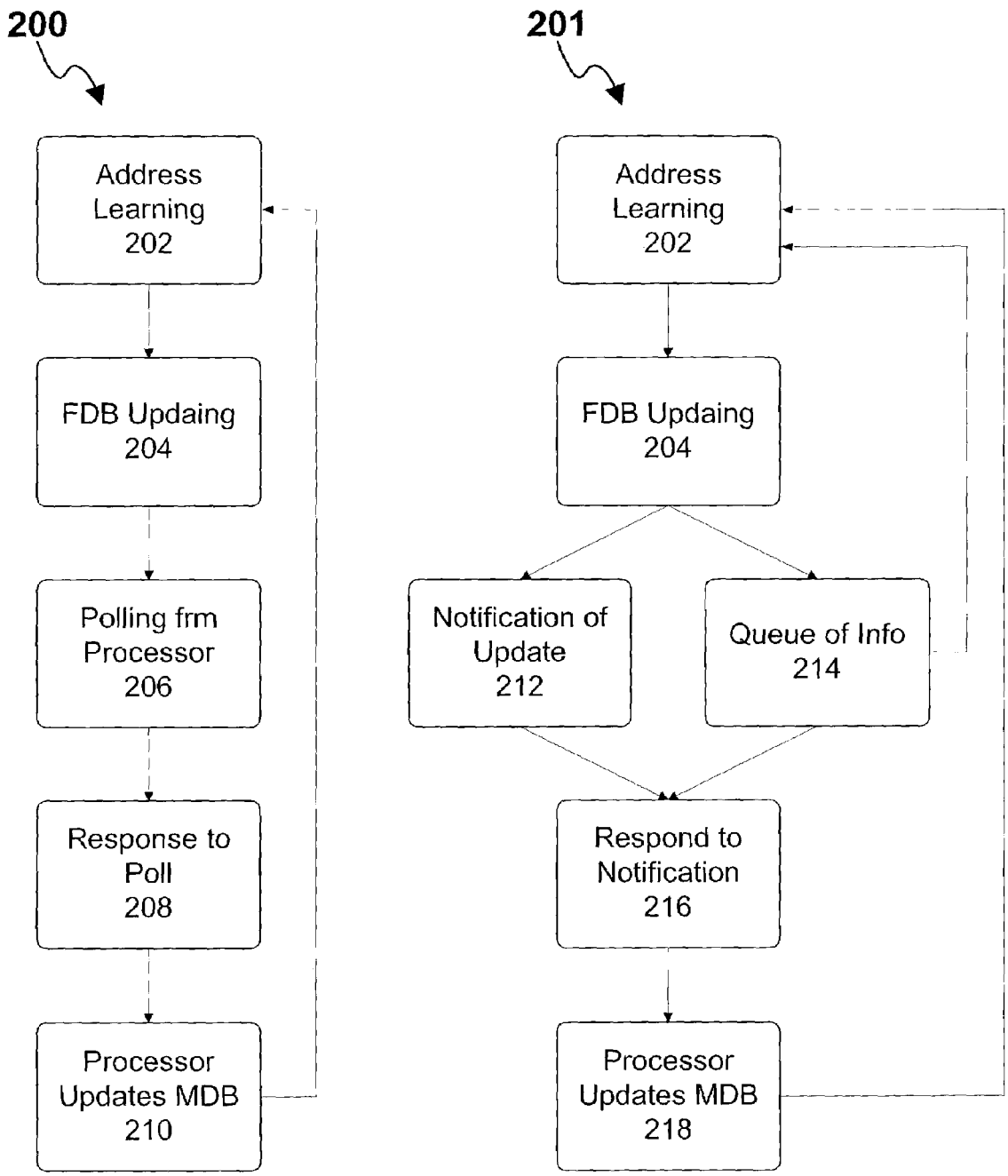
FIG. 2 is a block flow diagram of a synchronization mechanism in accordance with one embodiment of the claimed subject matter.

FIG. 2a and FIG. 2b are block flow diagrams, which may be used to illustrate the logical functions performed by a device such as network switch system 100, although the order presented does not infer a particular order of execution of the following functions when implemented. FIG. 2a illustrates the logic 200 performed by a network device when in the process of maintaining one or more address databases. In this particular technique, a management database and a forwarding database may be maintained by a switch system such as network switch system 100, and one or more databases may comprise an address table. A forwarding database may be stored on one or more memory components of a switch such as network switch 102, for example. MDB may be stored on a processor subsystem such as address memory 122 of processor subsystem 114, for example. In operation, a network device such as a switch may learn addresses at block 202. Learning may be performed by resolving source address information for packets passing through the network device, for example. As an address is learned, it is added to the FDB 206, resulting in an update to the FDB at block 204.

A processor, such as a processor of processor subsystem 114, may monitor the FDB 206. This monitoring may be performed by one or more polling operations 206, where a poll is sent by a processor through an ASIC CAM (content addressable memory) interface 124, for example. The CAM interface may provide a communications interface between a switch 102 and a processor subsystem 114, for example. The polling operation 206 may be performed at regular intervals, for example. When a poll is received by the network device, the device may respond to the poll at block 208. The response may comprise a determination by one or more components of the device whether or not any updates to the FDB have been made since the last poll. If there has been an update, in this example, information may be provided to the processor subsystem 114 at block 208, for purpose of updating MDB 202. Information may comprise, for example, one or more addresses that were learned at block 202, or one or more other modifications made to a FDB, for example. If the network device responds to the poll 206 with an update to the FDB, the processor 114 may update the MDB at block 210. This process may be repeated at regular intervals, for example. Alternatively, a processor may compare the entire FDB with the MDB at regular intervals, and if it is determined that differences exist, one or more update operations may be performed. This updating may comprise an loading process wherein the FDB is imported into the MDB, for example. However, in these particular updating process, during the period of time between polling operations the FDB and the MDB may contain differing information, or be out of synch. Additionally, increasing the frequency of polling operations, comparing entire databases, and importing one or more databases to another location accessible by another database may unduly burden one or more subsystems of the network device, and may result in a less efficient device.

FIG. 2b is one embodiment of the claimed subject matter illustrating the logic 201 performed by a network device practicing one method of maintaining one or more address databases. In this embodiment, a management database and a forwarding database may be maintained by network device such as network switch system 100, and each database may comprise an address table, for example. A FDB may be stored on the memory of a switch such as memory 110 of network switch 102, for example, and MDB may be stored on the memory 122 of processor subsystem 114, for example.

In operation, A network device, such as switch 102, may learn one or more addresses at block 202. Learning may be performed by resolving address information for packets passing through the switch, for example. However, in this embodiment, learning an address is not required to practice the claimed subject matter. Any event leading to a need to update a FDB may incorporate one or more of the logical functions disclosed herein. For example, a network topology change may result in a need to update the FDB. As an address is learned or other events result in the need to update the FDB, the FDB is updated at block 204, which may comprise, for example, address insertion, deletion or modification, for example. In this embodiment, block 204 may be functionally the same as block 204 of block flow diagram 200. At some time subsequent to the learning an address and/or updating the FDB at block 204, a notification may be provided to the system maintaining the MDB at block 212, which may comprise, for example, a notification to processor subsystem 114. This notification may comprise, for example, an event generation such as an interrupt. Notification may be provided, for example, when an address entry is added, deleted or modified on the FDB, for example. Additionally, once the FDB is updated, and proximate in time to providing notification, update information may be queued at block 214. Information queued may relate to the updated FDB, such as a new modified or deleted address entry. This queue may be located on memory 110 of switch 102, and may comprise, for example, a register based FIFO (first in first out) implementation. Alternatively, a DMA (direct memory access) may be performed by the switch 102, which may comprise a non-disruptive access to one or more components of processor subsystem 114, for example. A DMA may result in the information relating to the FDB being queued on one or more memory locations allocated by the processor subsystem, such as address memory 122, for example. In this embodiment, once information is queued, address learning may continue without the need for a network device to wait for a response from the device receiving the update as queued information, for example.

Once a notification is generated at block 212 and the information is queued at block 214, the processor subsystem 114 may respond to the notification at block 216. This response may comprise a substantial emptying of the queue generated or added to at block 214, for example. Once the processor subsystem responds to the notification at block 216, the processor subsystem may update the MDB at block 218. This update may comprise, for example, modifying the MDB based at last in part on the queued information added at block 214. Once the MDB is updated, the logic 201 may at least partially be executed again. Alternatively, if a processor subsystem does not service the notification before another address is learned at block 202, one or more of the functional blocks may be executed again prior to the processor servicing the notification, resulting in the queue being added to at block 214 with additional information.

Figure 3:
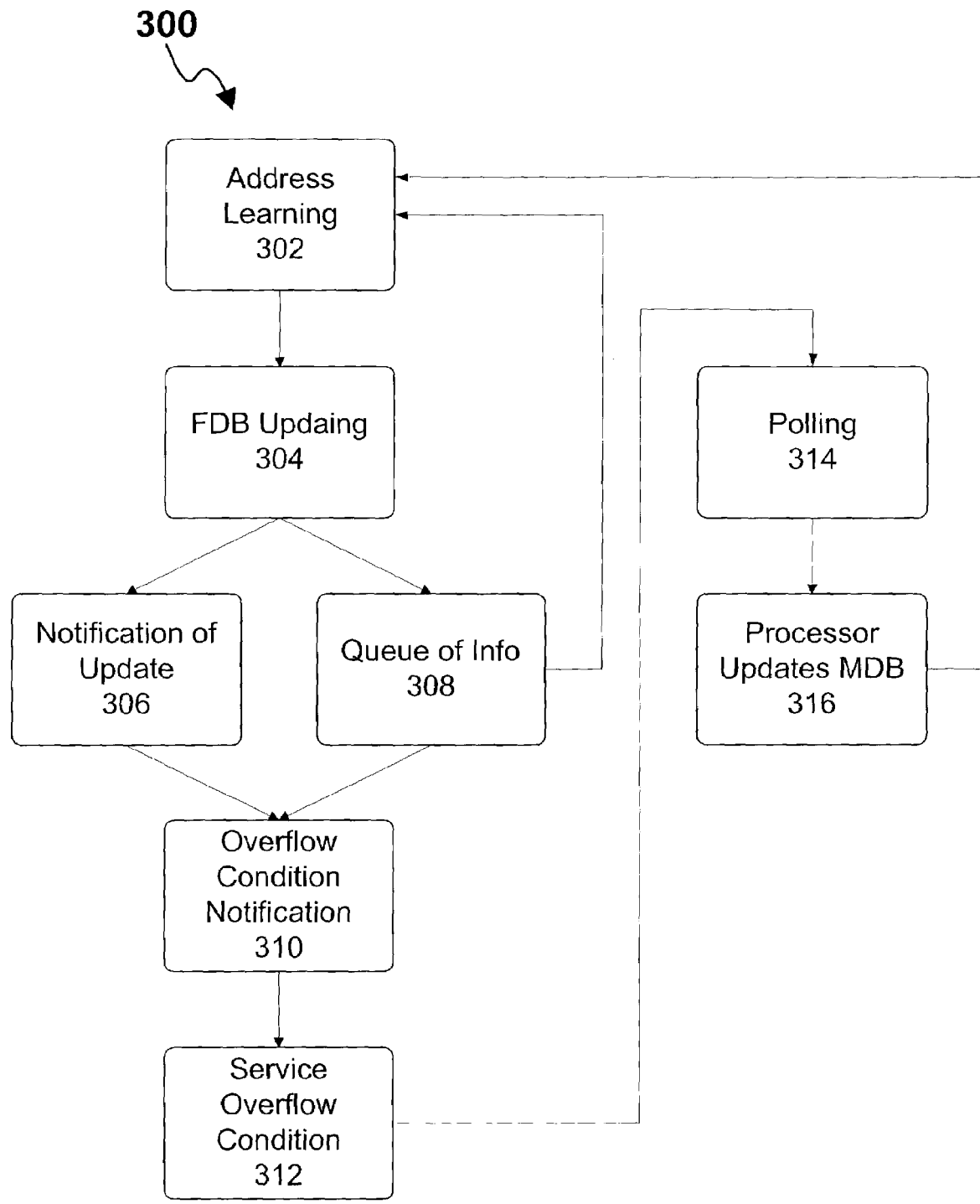
FIG. 3 is a block flow diagram of a synchronization mechanism in accordance with another embodiment of the claimed subject matter.

In one embodiment of a method of maintaining an address database, a processor subsystem 114 may not be capable of updating the MDB at the same rate update information is being provided by switch 102. In this particular embodiment, an alternative approach may be taken to managing the address tables, demonstrated by reference to FIG. 3. FIG. 3 is one embodiment of the claimed subject matter illustrating the logic 300 performed by a network device practicing one technique of maintaining one or more address databases. Several of the functional blocks are similar to those described in reference to FIG. 2 and will not be described in further detail. In this embodiment, a management database and a forwarding database may be maintained by network device. A FDB may be stored on the memory of a switch such as memory 110 of network switch 102, for example, and MDB may be stored on the memory 122 of processor subsystem 114, for example.

In operation, when a network device learns one or more addresses, the FDB is updated at block 304, which may comprise, for example, modifying at least a portion of the data maintained on the FDB, for example. At some time proximate to the learning an address and/or updating the FDB at block 304, a notification, such as an interrupt, may be provided at block 306, and may be provided to the system maintaining the MDB. Additionally, once the FDB is updated, update information may be queued at block 308. The queue may reside on allocated memory of the processor subsystem, such as address memory 122 of subsystem 114, for example. The queue may be updated by use of DMA (direct memory access).

In this embodiment, once data is queued at block 308, learning may continue at block 302, and a portion of the process will be repeated. In this embodiment, the subsystem maintaining the MDB may not be able to service the notification each time it is received, resulting in several updates being queued at block 308. Typically, memory allocated for a queue may be limited, and the queue may eventually overflow. After one or more passes through blocks 302-308, an overflow condition may result in the queue. A notification 310 may be provided to the processor maintaining the MDB that there is an overflow condition in the queue. At some time after receiving the notification 310, the processor may service the queue. However, one or more updates may not have been able to be queued, due to the error condition. If there have been one or more updates to the queue that have failed due to the overflow condition, the processor may perform one or more polling functions 314 of the FDB. This polling may be functionally similar to the polling functions disclosed in FIG. 2a. Polling functions may result in the one or more updates that were not properly queued being provided to the processor servicing the MDB. After the processor receives one or more responses to one or more polling functions, the processor may update the MDB at block 316. Once the polling operations are completed, the error condition of the queue overflow may be cleared. This particular embodiment may be used, for example, in a switch system where the switch has the capability to learn addresses and update the FDB at a greater rate than the processor subsystem is capable of reading a queue and updating a MDB, for example.

In one embodiment, a processor used in a processor subsystem 114 may be a general-purpose or dedicated processor, such as a processor from the family of processors made by Intel Corporation. Processor subsystem 114 may utilize software when performing one or more functions. The software may comprise programming logic, instructions or data to implement certain functionality for an embodiment of the claimed subject matter. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment of the claimed subject matter, the media may store programming instructions in a compressed and/or encrypted format, as well as instructions that may have to be compiled or installed by an installer before being executed by the processor. Alternatively, an embodiment of the claimed subject matter may be implemented as specific hardware components that contain hard-wired logic for performing the recited functionality, or by any combination of programmed general-purpose computer components and custom hardware components.

In one embodiment, a network switch may comprise an Intel Media Switch IXE2424 10/100+ Gigabit L2/3/4 device, as previously described. It is important to note, however, that embodiments of the claimed subject matter may be implemented in any network device that performs switching, routing, or other network functions, or interfaces with one or more tables such as an address table, which may comprise MAC addresses or TCP/IP addresses, for example. Additionally, certain features of the embodiments of the claimed subject matter have been illustrated as described herein, however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A method of managing network addresses, comprising:
learning information relating to a network address;
updating a first address database, wherein the first database is managed by a first device;
in response to the updating, providing a notification of the update to a second device managing a second address database;
queuing at least a portion of the update information in a queue;
determining whether the queue is in an overflow condition;
based on the determination, providing an indication to the second device that the queue is in the overflow condition;
in response to the indication that the queue is in the overflow condition, polling the first device to determine whether the first address database includes information that is not included in the second address database;
in response to the indication that the queue is in the overflow condition, determining whether the queue comprises information that is not included in the second address database; and
providing only the information that is not included in the second address database and the queue to the second device.

2. The method of claim 1, wherein the first address database comprises a forwarding database (FDB).

3. The method of claim 1, wherein the second address database comprises a management database (MDB).

4. The method of claim 1, wherein said information comprises a new network address.

5. The method of claim 1, wherein said learning is performed by resolving a packet received by a device.

6. The method of claim 1, wherein said first device comprises a network switch.

7. The method of claim 1, wherein said notification comprises an interrupt.

8. The method of claim 1, wherein said second device comprises a processor subsystem.

9. The method of claim 1, wherein said queuing includes one of direct memory access to one or more memory locations of said second device, and providing register based first in first out (FIFO) access to one or more memory locations of said second device.

10. The method of claim 1, wherein the first device is capable of learning network addresses and updating the first address database at a greater rate than the second device is capable of reading the queue and updating the second address database.

11. The method of claim 1, wherein providing the information consists essentially of providing information that is absent from the queue and the second address database to the second device.

12. The method of claim 1, wherein the information is not included in the queue due to the overflow condition.

13. The method of claim 1, wherein said first device comprises a network switch and wherein said second device comprises a processor subsystem of the network switch.

14. The method of claim 1, further comprising coupling the first device and the second device via a peripheral component interconnect (PCI) interface.

15. The method of claim 1, further comprising coupling the first device and the second device via a content addressable memory (CAM) interface.

16. An apparatus, comprising:
a network device, coupled to a network and configured to:
maintain a forwarding database;
determine whether to update the forwarding database;
update the forwarding database based on the determination;
in response to the update, send a notification of the update to one or more other devices, the one or more other devices coupled to the network device;
forward information related to the update to a queue associated with the one or more other devices;
determine whether the queue associated with the one or more other devices is in an overflow condition; and
based on the determination, provide an indication to the one or more other devices that the queue is in the overflow condition, wherein based on providing the indication to the one or more other devices, the network device is to:
receive a poll request to determine whether the forwarding database includes information that is not included in a management database maintained by a device from among the one or more other devices;
determine whether the queue comprises information that is not included in the forwarding database; and
provide only the information that is not included in the management database and the queue to the device.

17. The apparatus of claim 16, wherein said network device comprises a switch.

18. The apparatus of claim 16, wherein said one or more other devices maintaining the management database comprise a processor subsystem.

19. The apparatus of claim 16, wherein said update is performed at some time subsequent to said network device resolving an address for a packet.

20. The apparatus of claim 16, wherein said notification comprises an interrupt operation.

21. The apparatus of claim 16, wherein the network device is capable of updating the forwarding database at a greater rate than at least the device, from among the one or more other devices, is capable of reading the queue and updating the management database.

22. The apparatus of claim 16, wherein the information that the network device is to provide to the device consists essentially of information that is absent from the queue and the management database.

23. The apparatus of claim 16, wherein the information is not included in the queue due to the overflow condition.

24. The apparatus of claim 16, wherein said network device comprises a network switch and wherein said one or more other devices maintaining the management database comprise a processor subsystem of the network switch.

25. The apparatus of claim 16, further comprising a peripheral component interconnect (PCI) interface to couple the network device and the one or more other devices.

26. The apparatus of claim 16, further comprising a content addressable memory (CAM) interface to couple the network device and the one or more other devices.

27. An article comprising:
a storage medium;
said storage medium including stored instructions that, when executed by a processor, result in:
 a first device learning information relating to a network address;
 updating a first address database managed by the first device;
 in response to the updating, providing a notification of the update to a second device managing a second address database;
 queuing at least a portion of the update information in a queue;
 determining whether the queue is in an overflow condition; and
 providing an indication to the second device that the queue is in the overflow condition, wherein based on providing the indication to the second device, the first device is to:
  receive a poll request to determine whether the first address database includes information that is not included in the second address database maintained by second device;
  determine whether the queue comprises information that is not included in the second address database; and
  provide only the information that is not included in the second address database and the queue to the second device.

28. The article of claim 27, wherein the first address database comprises a forwarding database (FDB).

29. The article of claim 27, wherein the second address database comprises a management database (MDB).

30. The article of claim 27, wherein said update information comprises a new network address.

31. The article of claim 27, wherein said learning is performed by resolving a packet received by the first device.

32. The article of claim 27, wherein said first device comprises a network switch.

33. The article of claim 27, wherein said notification comprises an interrupt.

34. The article of claim 27, wherein said second device comprises a processor subsystem coupled to the first device.

35. The article of claim 27, wherein the first device is capable of learning information regarding network addresses and updating the first address database at a greater rate than the second device is capable of reading the queue and updating the second address database.

36. The article of claim 27, wherein the information provided to the second device consists essentially of information that is absent from the queue and the second address database.

37. The article of claim 27, wherein the information is not included in the queue due to the overflow condition.

38. The article of claim 27, wherein said first device comprises a network switch and wherein said second device comprises a processor subsystem of the network switch.

39. The article of claim 27, wherein the first device and the second device are coupled via a peripheral component interconnect (PCI) interface.

40. The article of claim 27, wherein the first device and the second device are coupled via a content addressable memory (CAM) interface.

* * * * *